Patented Apr. 17, 1951

2,549,435

UNITED STATES PATENT OFFICE 2,549,435

PROCESSES FOR BREAKING PETROLEUM EMULSIONS

Melvin De Groote, University City, and Arthur F. Wirtel and Owen H. Pettingill, Kirkwood, Mo., assignors to Petrolite Corporation, Ltd., Wilmington, Del., a corporation of Delaware Application August 11, 1949, Serial No. 109,794

7 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed, is our companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See our co-pending application Serial No. 109,795, filed August 11, 1949.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present process is concerned with the breaking of petroleum emulsions by means of certain glycol ethers of beta-terpineol, and particularly in the form of cogeneric mixtures, as hereinafter described. These products are obtained by treatment of beta-terpineol with ethylene oxide and propylene oxide within the limits and manner hereinafter specified.

Beta-terpineol is of less significance in ordinary commerce than alpha-terpineol. One reason is that it is available to a lesser degree, and, additionally, costs considerably more—approximately two to three times the price of alpha-terpineol. For ordinary purposes there is apparently no justification for using the more expensive compound.

The ultimate demulsifying agent obtained from beta-terpineol, as compared with alpha-terpineol, may represent a product which costs approximately one cent a pound more, or thereabouts. On some emulsions the beta-terpineol derivative may be 5% to 10% better than the corresponding alpha derivative, and thus, the difference in cost is not necessarily material in all instances.

Although isomeric with each other, there is obviously a distinct difference between alpha-terpineol and beta-terpineol, which is obvious in their structures:

Alpha-terpineol          Beta-terpineol

Alpha-terpineol is characterized by the fact that it may be considered a substituted cycloaliphatic olefine. On this basis, beta-terpineol is a substituted aliphatic olefine. Moreover, in the alpha-terpineol, the hydroxyl radical appears in the aliphatic side chain completely removed from the ring structure, whereas, in beta-terpineol it appears in the carbon atom, which is part of the ring, and connected to the side chain group. On oxyalkylation, in alpha-terpineol the repetitious ether linkage enters at a carbon atom not attached to the ring and at a point lying between two methyl groups and the ring. In beta-terpineol, the alkylene oxide yields the repetitious ether chain attached to a carbon atom which is part of the ring structure, and beyond this point there is only one methyl group. In the hydroxylated ether compounds so obtained there is the further difference, of course, that in the alpha-terpineol derivative the unsaturation is in the ring structure and in the beta-terpineol derivative the unsaturation is in the side structure. This difference, although obscure, does have an ultimate effect on the surface-active nature of the derivative, on their solubility, etc.

It is well known that a variety of compounds containing a reactive hydrogen atom, i. e., a hydrogen atom attached to oxygen, nitrogen, or sulphur, will react with alkylene oxides, particularly ethylene oxide, or propylene oxide, to yield the corresponding glycol or polyglycol derivative. Such oxyalkylated derivatives are readily prepared from chemical compounds in which the hydrogen atom is directly attached to oxygen, and particularly in the case of alcohols or phenols, such as aliphatic alcohols, phenols, alkylaryl alcohols, alicyclic alcohols, phenoxyalkanols, substituted phenoxyalkanols, etc. Generally speaking, it has been found advantageous to react a water-insoluble hydroxylated material, having 8 carbon atoms or more, with an alkylene oxide so as to introduce water-solubility, or at least significant or distinct hydrophile character, with the result that the derivative so obtained has surface-active properties.

Examples of suitable reactants of this type include octyl alcohol, decyl alcohol, dodecyl alcohol, tetradecyl alcohol, octadecyl alcohol, butylphenol, propylphenol, propylcresol, hexylphenol, octylphenol, nonylphenol, and cardanol, as well as the corresponding alicyclic alcohols obtained by the hydrogenation of the aforementioned phenols. It has been suggested that at least some of such materials be used in the resolution of petroleum emulsions. As far as we are aware, none of such materials represent products which are acceptable in demulsification today from a competitive standpoint. In the majority of cases such products are apt to be one-sixth, one-fifth, one-fourth, or one-third as good as available demulsifying agents on the same percentage-of-active-material basis, or same cost basis.

We have discovered a very few exceptions to the above general situation. For example, we have discovered, if one treats beta-terpineol with ethylene oxide and propylene oxide so as to yield a cogeneric mixture of glycol ethers, that such mixed derivative has unusual properties, provided the composition lies within a certain range, as hereinafter specified. A specific exemplification of this range is the product obtained by treating one mole of beta-terpineol with 15 moles of propylene oxide, and then with 18 moles of ethylene oxide. Similarly, one may treat the beta-terpineol with the 18 moles of ethylene oxide first and then with the 15 moles of propylene oxide next.

In subsequent paragraphs from time to time, reference is made to "compounds or cogeneric mixtures." At first glance, it may appear that such language is indefinite, and perhaps contradictory. It is the intention at the moment only to point out that there is no inconsistency in such description, and that subsequently, there will be a complete explanation of why such designation is entirely proper.

The cogeneric mixtures of glycol ethers of beta-terpineol are unusually effective demusifying agents on a comparatively small number of oil field emulsions, which, oddly enough, appear rather widely distributed geographically. These beta-terpineol ether mixtures do not appear to be universally competitive, and, as a matter of fact, appear to be highly selective in regard to their action as demulsifying agents. However, such products have significant utility in a number of different oil fields where they serve better than any other available demulsifying agent. Their utility may, of course, increase as time goes along.

The attached drawing is that of a conventional graph for representation of proportions of constituents for three-component compositions wherein the proportions of each may vary from zero to 100%. Compositions which have the three constituents present in such proportions as to fall within the area 8, 9, 10 and 11 are those the use of which is claimed in this application.

It is very peculiar that the effectiveness of the demulsifying agents herein described seem to be limited to a very narrow range, or area, as far as composition goes.

Figure 1:
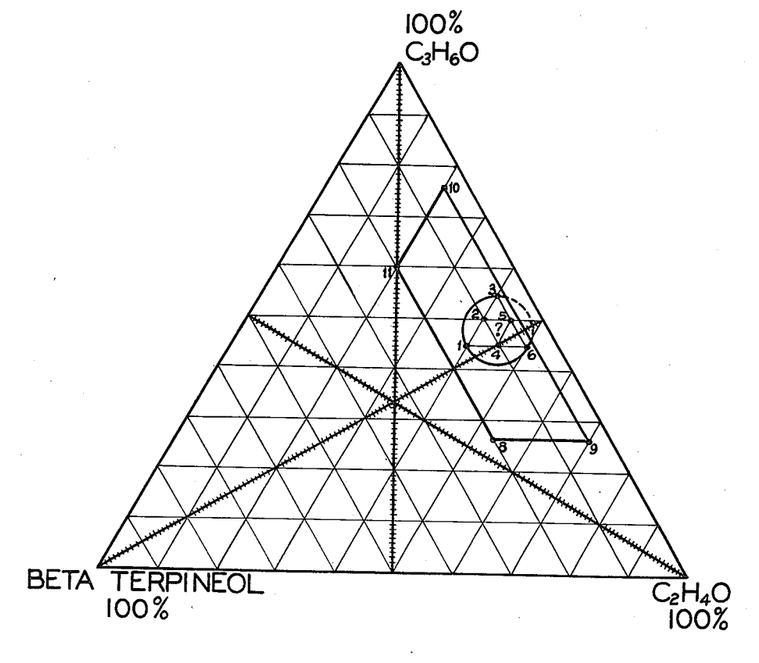

Reference is made to the accompanying drawing, in which there is presented a triangular graph showing the composition of certain glycol ethers of beta-terpineol, or cogeneric mixtures thereof, derivable from beta-terpineol and ethylene oxide alone, or beta-terpineol and propylene oxide alone, or beta-terpineol and both propylene oxide and ethylene oxide, in terms of the initial reactants. We have found that effective demulsifying agents lie approximately within a small and hitherto unsuspected area, indicated by the trapezoid determined by the points 8, 9, 10 and 11. More specifically, particularly effective demulsifying agents appear within a smaller range, as set forth approximately by the area indicated by the segment of a circle in which the area of the segment is limited to derivatives in which beta-terpineol contributes at least 4% by weight of the ultimate compound or cogeneric mixture.

The circle itself is identified by the fact that the points 1, 3 and 6 appear on the circle. The more effective of these better compounds or cogeneric mixtures are those which appear within the triangle which represents part of the circle and part of the segment, to wit, the triangle identified by the points 1, 3 and 6. The most effective compounds or cogeneric mixtures of all are those which fall within the inner central triangle of the larger outer triangle identified by the points 1, 3 and 6, to wit, the smaller triangle identified by the points 2, 4 and 5. The most outstanding of these effective compounds or cogeneric mixtures is one which appears to fall substantially at the center of the smaller triangle identified by point 7. This particular point is obtained by treating one mole of beta-terpineol with 15 moles of propylene oxide, followed by treatment with 18 moles of ethylene oxide.

In spite of the unique character of the compounds or cogeneric mixtures previously described, we have made additionally an invention within an invention. This can be illustrated by reference to the compounds or cogeneric mixtures whose composition is determined by the inner triangle 2, 4, 5. This preferred class of derivatives, or for that matter, all the herein described products, can be made in three different ways: (a) by adding propylene oxide first and then ethylene oxide; (b) by adding ethylene oxide first and then propylene oxide; or (c) by adding the two oxides by random, indifferent, or uncontrolled addition so as to produce a polyglycol ether in which the propylene radicals and ethylene radicals do not appear in continuous succession, but are heterogeneously distributed.

We have found that if propylene oxide is added first and then ethylene oxide is added, the compounds or cogeneric mixtures so obtained are invariably and inevitably more effective as demulsifiers, and are also more effective for other purposes than the comparable glycol ethers of beta-terpineol made by combining the three reactants in any other sequence. This will be explained further with additional illustrations subsequently.

As an illustration of the preparation of various compounds or cogeneric mixtures, and particularly the most desirable ones, and also those which are helpful in setting the limits in the graph previously referred to, the following examples are included. In connection with these examples it will be noted that the oxyalkylation of beta-terpineol, i. e., by treatment with ethylene oxide or propylene oxide, or a mixture of the two, is conventional. The procedure is conducted in the same manner employed in connection with other alcohols or the like, and generally an alkaline catalyst is employed. See, for example, U. S. Patent No. 2,440,093, dated April 20, 1948, to Isreal, and British Patent No. 602,591, applied for February 12, 1945.

Example 1

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M. There were charged into the autoclave 15.4 pounds of beta-terpineol. There were then added 12½ ounces (approximately 5% by weight) of ground caustic soda. The autoclave was sealed, swept with nitrogen gas, and stirring started immediately and heat applied, and the temperature allowed to rise to approximately 150° C. At this point addition of propylene oxide was started. It was added continuously at such speed that it was absorbed by the reaction as rapidly as added. The amount of propylene oxide added was 88 pounds. The time required to add this propylene oxide was slightly in excess of four hours, about 4¾ hours. During this time the temperature was maintained at 150° to 160° C., using cooling water through the inner coils, when necessary, and otherwise applying heat, if required. At the end of the addition of the propylene oxide there was added ethylene oxide, as previously indicated. The amount of ethylene oxide added was 92.4 pounds. The temperature employed, and operating conditions, were the same as with the addition of propylene oxide. It is to be noted, however, that ethylene oxide appears to be more reactive and the reaction seems to require a greater amount of cooling water to hold the temperature range indicated. The time required to add the ethylene oxide was about the same, or slightly less, usually just a little more than an hour.

During the addition of the oxides, the pressure was held at approximately 50 pounds per square inch gauge pressure, or less. When all the oxide had been added (ethylene oxide being the final addition in this particular instance) the autoclave was permitted to stay at the same temperature range for another half hour, even longer, if required, or until the gauge pressure had been reduced to zero or substantially zero, indicating the reaction was complete. The final product was an oily material, somewhat viscous in nature, resembling castor oil and having a definite beta-terpineol or terpene-like odor. It was soluble in water and also soluble in non-aqueous solvents, such as aromatic hydrocarbons, and others, although not soluble in some non-polar hydrocarbon solvents. The final yield was substantially the total weight of the initial reactants.

Example 2

The same procedure was followed as in Example 1, preceding, except that the order of addition of the oxides was reversed, the ethylene oxide being added first and the propylene oxide last. The time period, temperature range, pressure, etc., were kept the same as in Example 1, preceding.

Example 3

The same procedure was followed as in Example 1, except that a mixture, to wit, 168 pounds of propylene oxide and ethylene oxide, were added over a two-hour period. This mixture of ethylene oxide and propylene oxide was obtained from 88 pounds of propylene oxide and 80 pounds of ethylene oxide. In this instance again the time range, temperature, and pressure were kept substantially the same as in Example 1, preceding.

Example 4

The same procedure was followed as in Example 1, preceding, but was conducted on a laboratory scale employing a small autoclave having a capacity of approximately one liter, or up to a 5-gallon size. The amount of beta-terpineol employed was 46.2 grams, the amount of propylene oxide employed was 259.8 grams, and the amount of ethylene oxide employed was 240 grams. The amount of caustic soda used as a catalyst was 2.33 grams. The operating conditions were substantially the same as on a larger scale. Actually, the reaction seemed to go faster in the small autoclave and the time of absorption could be reduced, if desired. In many instances, absorption would take place in the labortary autoclave in a fraction of the time required in the larger autoclave; in fact, in many instances absorption was complete in 5 to 10 or 15 minutes, as compared to one hour on a larger scale. Needless to say, on a large scale, addition must be conducted carefully because there is an obvious hazard in handling a large quantity of material in an autoclave which is not necessarily present in the use of a small vessel.

Example 5

The same procedure was followed as in Example 4, preceding, in every respect, except the variation described in Example 2, preceding, i. e., the ethylene oxide, was added first and the propylene oxide added last.

Example 6

The same procedure was followed as in Example 4, in every instance except the modification previously described in Example 3, to wit, the propylene oxide and the ethylene oxide were mixed together and added in approximately 15 minutes to one-half hour. In all other respects the procedure was identical with that described in Example 4.

Previous reference has been made to the fact that there is a distinct difference in structure between alpha-terpineol and beta-terpineol. Reference has been made also to the fact that it is sometimes more difficult to oxyalkylate beta-terpineol, particularly to oxypropylate beta-terpineol, at least in the initial stage, than in the case of alpha-terpineol. Possibly the structural difference is the basis for this retarded activity. As an illustration of this difference, reference is made to the two following examples, to wit, Examples 7 and 8.

In Example 7 alpha-terpineol is treated with, roughly, 15 moles of propylene oxide and then with 18 moles of ethylene oxide. In Example 8 the experiment was repeated, using beta-terpineol. Note the time-pressure difference in oxypropylation.

*Example 7*

The reaction vessel employed was a glass Pyrex pipe, flanged at both ends, containing heating coils, stirring propellers and tubes designed to allow continuous addition of ethylene and propylene oxide below the liquid level. All metal structure was stainless steel. The stirring speeds used were approximately 1750 R. P. M. The capacity of the reactor was about 1½ gallons. The reactor was charged with 400 grams of alpha-terpineol, 400 grams of an inert solvent (high boiling aromatic petroleum solvent), and 20 grams sodium hydroxide. The temperature was brought up to 160° C. and held there throughout the entire experiment. Propylene oxide was run in at a rate which produced no more than a maximum pressure of 5 pounds on the reactor. The entire oxypropylation time was about 4 hours. About 2250 grams of propylene oxide were run in during this time. Following the oxypropylation about 2075 grams of ethylene oxide were run in, in about 4 hours. The whole mixture was then diluted with 1,000 grams more of the same inert solvent previously used.

The final product was an oily liquid, clear, and having a slight piney odor. It was soluble or emulsifiable in water and also soluble in some non-aqueous solvents. The final yield was substantially the total weight of the initial reactants.

*Example 8*

The same procedure was followed as in Example 7, but beta-terpineol was used in place of alpha-terpineol. The following ingredients were charged into the reactor:

| | Grams |
|---|---|
| Beta-terpineol, technical grade | 300 |
| Inert solvent | 300 |
| Sodium hydroxide | 15 |

The entire mixture was brought up to 160° C. and held there throughout the experiment. Propylene oxide was started in, exactly as in Example 7. However, the pressure rose above 5 pounds sometimes going as high as 15 pounds, indicating that the reaction was not taking place. More catalyst was then added, until 7 grams of sodium hydroxide and 5 grams of sodium methoxide had been charged into the reactor. With the extra catalyst added, the propylene oxide combined at a pressure of 5 pounds, but very much more slowly than it did with the alpha-terpineol. The total oxypropylation time was about 10 hours. A total of 1689 grams of propylene oxide were run in this time. 1555 grams of ethylene oxide were run in after the propylene oxide was added. The ethylene oxide reacted in about four hours, as in Example 7, after which 750 grams of the same inert solvent as used above were added to the mixture.

The final yield was substantially the same as the total weight of the reactants, and was a clear, viscous liquid, having a piney odor.

The following table includes a series of compounds or cogeneric mixtures which have been selected as exemplifying the herein included products. Types of the herein noted compounds or cogeneric mixtures have been produced in three different ways: (a) first adding the propylene oxide and then the ethylene oxide; (b) first adding the ethylene oxide and then the propylene oxide; and (c) mixing the ethylene oxide and the propylene oxide together and adding them simultaneously.

The data are summarized in the following table:

| Ex. No. | Beta-Terpineol | | | Propylene Oxide | | | Ethylene Oxide | | | Point on graph identifying specific Glycol Ether |
|---|---|---|---|---|---|---|---|---|---|---|
| | Weight Used in Grams | Molal Ratio | Weight Per Cent in Final Glycol Ether | Weight Used in Grams | Molal Ratio | Weight Per Cent in Final Glycol Ether | Weight Used in Grams | Molal Ratio | Weight Per Cent in Final Glycol Ether | |
| A | 154 | 1.0 | 15.0 | 462 | 7.96 | 45 | 411 | 9.34 | 40 | 1 |
| B | 154 | 1.0 | 10.0 | 771 | 13.3 | 50 | 615 | 14.0 | 40 | 2 |
| C | 154 | 1.0 | 5.0 | 1,700 | 29.3 | 55 | 1,232 | 28.0 | 40 | 3 |
| D | 154 | 1.0 | 10.0 | 693 | 11.95 | 45 | 693 | 15.77 | 45 | 4 |
| E | 154 | 1.0 | 5.0 | 1,542 | 26.6 | 50 | 1,390 | 31.6 | 45 | 5 |
| F | 154 | 1.0 | 5.0 | 1,390 | 23.95 | 45 | 1,542 | 35.10 | 50 | 6 |
| G | 154 | 1.0 | 8.45 | 866 | 14.95 | 47.55 | 800 | 18.17 | 44 | 7 |
| H | 154 | 1.0 | 9.2 | 812 | 14.0 | 48.6 | 704 | 16.0 | 42.2 | (¹) |
| I | 154 | 1.0 | 9.0 | 812 | 14.0 | 47.4 | 748 | 17.0 | 43.6 | (¹) |
| J | 154 | 1.0 | 8.8 | 812 | 14.0 | 46.2 | 792 | 18.0 | 45.0 | (¹) |
| K | 154 | 1.0 | 8.7 | 870 | 15.0 | 49.0 | 748 | 17.0 | 43.3 | (¹) |
| G | 154 | 1.0 | 8.45 | 866 | 14.96 | 47.55 | 800 | 18.17 | 44 | ² 7 |
| L | 154 | 1.0 | 8.3 | 870 | 15.0 | 46.7 | 836 | 19.0 | 45.0 | (¹) |
| M | 154 | 1.0 | 8.2 | 934 | 16.0 | 49.5 | 792 | 18.0 | 42.3 | (¹) |
| N | 154 | 1.0 | 8.0 | 934 | 16.0 | 48.5 | 836 | 19.0 | 43.5 | (¹) |
| O | 154 | 1.0 | 7.8 | 934 | 16.0 | 47.4 | 880 | 20.0 | 44.8 | (¹) |
| P | 154 | 1.0 | 20.0 | 200 | 3.45 | 26 | 416 | 9.45 | 54 | ³ 8 |
| Q | 154 | 1.0 | 4.0 | 1,000 | 17.25 | 26 | 2,690 | 61.2 | 70 | ³ 9 |
| R | 154 | 1.0 | 4.0 | 2,925 | 50.4 | 76 | 770 | 17.5 | 20 | ³ 10 |
| S | 154 | 1.0 | 20.0 | 462 | 7.96 | 60 | 154 | 3.5 | 20 | ³ 11 |

¹ Within inner triangular area.
² Duplicated for convenience.
³ Indicates limits of trapezoidal area.

In the preparation of the above compounds the alkaline catalyst used was either flake caustic soda finely ground with mortar and pestle, or powdered sodium methylate, equivalent to 5% by weight of the beta-terpineol which was employed.

For reasons which are pointed out hereinafter in greater detail, it is substantially impossible to use conventional methods and obtain a single glycol ether of the kind described. Actually, one obtains a cogeneric mixture of closely related or touching homologues. These materials invariably have high molecular weights and cannot be separated from one another by any known method without decomposition. The properties of such a mixture represent the contribution of the various individual members of the mixture.

Although one cannot draw a single formula and say that by following such and such procedure one can obtain 80% or 90% or 100% of such single compound, yet one can readily draw the formulae of a large number of compounds which appear in some of the mixtures described else- where, or can be prepared readily as components of mixtures which are manufactured conventionally. Such formulae, representing significant portions of various mixtures, are of distinct value, insofar that they themselves characterize the invention, i. e., describe individual components which are typical of the members of the cogeneric mixture. In the following formulae, since ROH can represent beta-terpineol, RO is the ether radical obtained from beta-terpineol by removal of the hydrogen atom attached to the oxygen atom.

(1)  $RO(C_2H_4O)_{17}(C_3H_6O)_{15}H$
(2)  $RO(C_2H_4O)_{18}(C_3H_6O)_{15}H$
(3)  $RO(C_2H_4O)_{19}(C_3H_6O)_{15}H$
(4)  $RO(C_2H_4O)_{18}(C_3H_6O)_{16}H$
(5)  $RO(C_2H_4O)_{19}(C_3H_6O)_{16}H$
(6)  $RO(C_2H_4O)_{20}(C_3H_6O)_{16}H$
(7)  $RO(C_2H_4O)_{20}(C_3H_6O)_{17}H$
(8)  $RO(C_2H_4O)_{21}(C_3H_6O)_{17}H$
(9)  $RO(C_3H_6O)_{15}(C_2H_4O)_{17}H$
(10) $RO(C_3H_6O)_{15}(C_2H_4O)_{18}H$
(11) $RO(C_3H_6O)_{15}(C_2H_4O)_{19}H$
(12) $RO(C_3H_6O)_{16}(C_2H_4O)_{18}H$
(13) $RO(C_3H_6O)_{16}(C_2H_4O)_{19}H$
(14) $RO(C_3H_6O)_{16}(C_2H_4O)_{20}H$
(15) $RO(C_3H_6O)_{17}(C_2H_4O)_{20}H$
(16) $RO(C_3H_6O)_{6}(C_2H_4O)_{18}(C_3H_6O)_{9}H$
(17) $RO(C_3H_6O)_{7}(C_2H_4O)_{18}(C_3H_6O)_{8}H$
(18) $RO(C_3H_6O)_{8}(C_2H_4O)_{18}(C_3H_6O)_{7}H$
(19) $RO(C_3H_6O)_{6}(C_2H_4O)_{18}(C_3H_6O)_{9}H$
(20) $RO(C_3H_6O)_{5}(C_2H_4O)_{18}(C_3H_6O)_{10}H$
(21) $RO(C_2H_4O)_{8}(C_3H_6O)_{15}(C_2H_4O)_{10}H$
(22) $RO(C_2H_4O)_{9}(C_3H_6O)_{15}(C_2H_4O)_{9}H$
(23) $RO(C_2H_4O)_{10}(C_3H_6O)_{15}(C_2H_4O)_{8}H$
(24) $RO(C_2H_4O)_{11}(C_3H_6O)_{15}(C_2H_4O)_{7}H$
(25) $RO(C_3H_6O)_{8}(C_2H_4O)_{7}(C_3H_6O)_{7}(C_2H_4O)_{11}H$
(26) $RO(C_3H_6O)_{8}(C_2H_4O)_{8}(C_3H_6O)_{7}(C_2H_4O)_{10}H$
(27) $RO(C_3H_6O)_{7}(C_2H_4O)_{9}(C_3H_6O)_{8}(C_2H_4O)_{9}H$
(28) $RO(C_3H_6O)_{7}(C_2H_4O)_{10}(C_3H_6O)_{8}(C_2H_4O)_{8}H$
(29) $RO(C_2H_4O)_{10}(C_3H_6O)_{8}(C_2H_4O)_{8}(C_3H_6O)_{7}H$
(30) $RO(C_2H_4O)_{9}(C_3H_6O)_{8}(C_2H_4O)_{9}(C_3H_6O)_{7}H$
(31) $RO(C_2H_4O)_{9}(C_3H_6O)_{7}(C_2H_4O)_{9}(C_3H_6O)_{8}H$
(32) $RO(C_2H_4O)_{8}(C_3H_6O)_{7}(C_2H_4O)_{10}(C_3H_6O)_{8}H$

If one selects any hydroxylated compound and subjects such compound to oxyalkylation, such as oxyethylation or oxypropylation, it becomes obvious that one is really producing a polymer of the alkylene oxide, except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent, which, for sake of convenience, may be indicated as $RO(C_2H_4O)_{30}H$. Instead, one obtains a cogeneric mixture of closely related homologues, in which the formula may be shown as the following: $RO(C_2H_4O)_nH$, wherein $n$, as far as the statistical average goes, is 30, but the individual members present in significant amount may vary from instances where $n$ has a value of 25 and perhaps less, to a point where $n$ may represent 35 or more. Such mixture is, as stated, a cogeneric, closely related series of touching homologous compounds. Considerable investigation has been made in regard to the distribution curves for linear polymers. Attention is directed to the article entitled "Fundamental principles of condensation polymerization," by Paul J. Flory, which appears in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

Actually, from a practical standpoint, it is much more satisfactory, perhaps, to describe the ultimate composition in terms of the reactants, i. e., beta-terpineol and the two alkylene oxides. The reason for this statement is the following: If one selects a specific compound, it must be borne in mind that such compound is specific only insofar that the cogeneric mixture in terms of a statistical average will conform to this formula. This may be illustrated by an example, such as $RO(C_3H_6O)_{15}(C_2H_4O)_{18}H$ If one combines the reactants in the predetermined weight ratio so as to give theoretically this specific component, and assuming only one chemical compound were formed, what happens is that, although this particular compound may be present in a significant amount and probably less than 50%, actually one obtains a cogeneric mixture of touching homologues in which the statistical average does correspond to this formula. For instance, selecting reactants, which, at least theoretically, could give the single compound $RO(C_3H_6O)_{15}(C_2H_4O)_{18}H$, what actually happens is that one obtains a sort of double cogeneric mixture, for the reason that in each batch or continuous addition of an alkylene oxide a cogeneric mixture is formed. Since the present products require the addition of at least two different multi-molar proportions of each of two different alkylene oxides (ethylene oxide and propylene oxide) it becomes obvious that a rather complex cogeneric mixture must result.

This can be best illustrated by example. Assume that one is going to use the indicated ratio, to wit, one pound mole of beta-terpineol, 15 pound moles of propylene oxide, and 18 pound moles of ethylene oxide. The initial step involves the treatment of one pound mole of beta-terpineol with 15 pound moles of propylene oxide, so as to yield theoretically $RO(C_3H_6O)_{15}H$; actually, as pointed out, one does not obtain $RO(C_3H_6O)_nH$ in which $n$ is 15, but really one obtains a cogeneric mixture in which there are present significant amounts of homologues in which $n$ varies from 10, 11 and 12, on up to 17, 18 and possibly 19 or 20. A statistical average, however, must, of course, correspond to the proportion of the initial reactants, i. e., a compound of the formula $RO(C_3H_6O)_{15}H$ which is present undoubtedly to a significant extent.

When this cogeneric mixture is then subjected to reaction with 18 moles of ethylene oxide, it becomes obvious that, although one may obtain some $RO(C_3H_6O)_{15}(C_2H_4O)_{18}H$, yet this particular product can be present only to a minor extent, for reasons which have been described in connection with oxyethylation and which now are magnified to a greater degree by oxypropylation. Stated another way, it is probable that the cogeneric mixture represents something like $RO(C_3H_6O)_n(C_2H_4O)_{n'}H$ in which, as previously pointed out, components present in important percentages are those in which $n$ could vary from anywhere beginning with 10 to 12, on up to 18 or 20. By the same token, components present in important percentages are those in which $n'$ could vary anywhere from 13 or 14 up to the lower 20's, such as 21, 22, 23 or 24. Indeed, homologues of a lower or a higher value of $n$ and $n'$ will be present in minor amounts, the percentage of such components decreasing, the farther removed they are from the average composition. However, in spite of such variation in regard to the cogeneric mixture, the ultimate composition, based on the ingredients which enter into it and based on the statistical average of such constituents, can still be expressed by the formula $RO(C_3H_6O)_{15}(C_2H_4O)_{18}H$. This actual product exists to some degree in the cogeneric mixture, but it should be looked upon as a statistical average formula, rather than the structure of a single or predominant compound in the mixture.

A second reason for employing a reaction mixture to describe the product, is the fact that the molal proportions need not represent whole numbers. We have just pointed out that if one selects molal proportions corresponding to $$RO(C_3H_6O)_{15}(C_2H_4O)_{18}H,$$

then the constituents are added in actual molar proportions, based on whole numbers. If, however, one selects a point in the inner triangular area, which, when recalculated in terms of molar proportions, produces a fractional number, there is still no reason why such proportion of initial reactant should not be adopted. For instance, one might select a point in the triangular graph, which, when calculated in terms of molecular proportions, represents a formula, such as the following: $RO(C_3H_6O)_{15.5}(C_2H_4O)_{18}H$. This, of course, would be immaterial, for the reason that if one starts with a pound mole of beta-terpineol and adds 15.5 pound moles of propylene oxide, one will obtain, on the average, a mixture closely comparable to the one previously described, using exactly 15 pound moles of propylene oxide instead of 15.5. Such mixture corresponds to the compound $RO(C_3H_6O)_{15.5}H$ only in the sense of the average statistical value, but not in the sense that there actually can be a compound corresponding to such formula. Further discussion of this factor appears unnecessary in light of what has been said previously.

Such mixture could, of course, be treated with 18 pound moles of ethylene oxide. Actually, all that has been said sums up to this, and that is, that the most satisfactory way, as has been said before, of indicating actual materials obtained by the usual and conventional oxyalkylation process, is in terms of the initial reactants, and it is obvious that any particular point on the triangular graph, from a practical standpoint, invariably and inevitably represents the statistical average of several or possibly a dozen or more closely related cogeners of almost the same composition, but representing a series of touching homologues. The particular point selected represents at least the composition of the mixture expressed empirically in the terms of a compound representing the statistical average.

Previous reference has been made to the fact that comparatively few oxyalkylated derivatives of simple hydroxylated compounds find utility in actual demulsification practice. We have pointed out that we have found a very few exceptions to this rule. The fact that exceptions exist, as in the instant invention, is still exceedingly difficult to explain, if one examines the slight contribution that the end group, derived from the hydroxylated material, makes to the entire compound. Referring for the moment to a product of the kind which has been described and identified by the formula $RO(C_3H_6O)_{15}(C_2H_4O)_{18}H$, it becomes apparent that the molecular weight is in the neighborhood of 1800 and actually the beta-terpineol contributes less than 10% of the molecular weight. As a matter of fact, in other comparable compounds the beta-terpineol may contribute as little as 4% or 5% and yet these particular compounds are effective demulsifiers. Under such circumstances it would seem reasonable to expect that some other, or almost any other, cyclic 6-carbon atoms compound comparable to beta-terpineol would yield derivatives equally effective. Actually, this is not the case. We know of no theory or explanation to suggest this highly specific nature or action of the compound or cogeneric mixture derived from beta-terpineol.

Referring to an examination of the previous list of 32 compounds, it is to be noted that in certain examples, for instance, Examples 9 to 15, inclusive, all the propylene oxide is added first and then the ethylene oxide is added. Compounds indicated by Examples 1 to 8 are substantially the same, as far as composition goes, but are reversed, insofar that the ethylene oxide is added first and then the propylene oxide. Other compounds having substantially the same ultimate composition, or at least very closely related ultimate compositions, having a further variation in the distribution of the propylene oxide and ethylene oxide, are exemplified by Formulae 16 to 32, inclusive.

As has been pointed out previously, for some reason which we do not understand and for which we have not been able to offer any satisfactory theory, we have found that the best compounds, or more properly, cogeneric mixtures are obtained when all the propylene oxide is added first and then all the ethylene oxide is added. Although this is true to at least some extent in regard to all compositions within the trapezoidal area in the triangular graph, yet it is particularly true if the composition comes within the segment of the circle previously referred to in the accompanying drawing. In such event, one obtains a much more effective demulsifier than by any other combination employing ethylene oxide alone, propylene oxide alone, or any variation in the mixture of the two, as illustrated by other formulae. In fact, the compound or cogeneric mixture so obtained, as far as demulsification goes, is not infrequently at least one-third better than any other derivative obtained in the manner described involving any of the other above variations.

The significance of what has been said previously becomes more emphatic when one realizes that, in essence, we have found that one "isomer" is a more effective demulsifying agent than another "isomer." The word "isomer" is not exactly right, although it is descriptive for the purpose intended, insofar that we are not concerned with a single compound, but with a cogeneric mixture, which, in its statistical average, corresponds to such compound. Stated another way, if we start with one pound mole of beta-terpineol, 15 pound moles of propylene oxide and 18 pound moles of ethylene oxide, we can prepare two different cogeneric mixtures, which, on a statistical average, correspond to the following: $RO(C_2H_4O)_{18}(C_3H_6O)_{15}H$ and $$RO(C_3H_6O)_{15}(C_2H_4O)_{18}H$$

There is nothing we know which would suggest that the latter be a much more effective demulsifying agent than the former and also that it be more effective for other industrial purposes. The applicants have had wide experience with a wide variety of surface-active agents, but they are unaware of any other similar situation, with the exception of a few instances which are the subject-matter of other co-pending applications, or under investigation. This feature represents the invention within an invention previously referred to, and thus, becomes the specific subject-matter claimed in our co-pending applications Serial Nos. 109,796, and 109,797, both filed August 11, 1949.

Reference has been made to the fact that the product herein specified, and particularly for use as a demulsifier, represents a cogeneric mixture of closely related homologues. This does not mean that one could not use combinations of such cogeneric mixtures. For instance, in the previous table data have been given for preparation of cogeneric mixtures which statistically correspond, respectively, to points 1, 3 and 6. Such three cogeneric mixtures could be combined in equal weights so as to give a combination in which the mixed statistical average would correspond closely to point 7.

Similarly, one could do the same thing by preparing cogeneric mixtures corresponding to points 2, 4 and 5 described in the previous table. Such mixture could then be combined in equal parts by weight to give another combination which would closely correspond on a mixed statistical basis to point 7. Nothing said herein is intended to preclude such combinations of this or similar type.

As to the preparation of similar derivatives and their use in demulsification, or for various other purposes, see our co-pending applications Serial Nos. 109,794, 109,795, 109,796, and 109,797, all filed August 11, 1949.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexy alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of our process.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1, with 15 parts by weight of xylene and 10 parts by weight of isopropyl alcohol, an excellent demulsifier is obtained. Selection of the solvent will vary, depending upon the solubility characteristics of the oxyalkylated product, and of course, will be dictated in part by economic considerations, i. e., cost.

As noted above, the products herein described may be used not only in diluted form, but also may be used admixed with some other chemical demulsifier. For example, a mixture which exemplifies such combination is illustrated by the following:

Oxyalkylated derivative, for example, the product of Example 1, 20%;

A cyclohexylamine salt of a polypropylated naphthalene monosulfonic acid, 24%;

An ammonium salt of a polypropylated naphthalene mono-sulfonic acid, 24%.

A sodium salt of oil-soluble mahogany petroleum sulfonic acid, 12%;

A high-boiling aromatic petroleum solvent, 15%;

Isopropyl alcohol, 5%.

The above proportions are all weight percents.

Throughout the specification elsewhere reference has been made to homologues. It is quite likely that it would be equally proper in numerous instances, and perhaps in all the herein described products, to refer to isomers, as well as homologues. The reason for this statement is that propylene oxide, as differentiated from ethylene oxide, can, at least theoretically, combine with a hydroxylated material ROH to give two different derivatives, one being a primary alcohol and the other a secondary alcohol. This is illustrated by the following:

Elsewhere in the specification the word "isomer" has been used thus: "isomer." It is not believed there is any confusion between such terminology in that particular instance and what is said immediately preceding.

Attention is directed to the fact that the herein described compounds, compositions and the like which are particularly adapted for use as demulsifiers for water-in-oil emulsions, as found in the petroleum industry, are hydroxylated derivatives, i. e., carry or include a terminal hydroxyl radical as part of their structure. We have found that if such hydroxylated compound or compounds are reacted further, so as to produce entirely new derivatives, such new derivatives have the properties of the original hydroxylated compound, insofar that they are effective and valuable demulsifying agents for resolution of water-in-oil emulsions, as found in the petroleum industry, as break inducers in doctor treatment of sour crude, etc.

Such hydroxylated compounds can be treated with various reactants, such as glycide, epichlorohydrin, dimethyl sulfate, sulfuric acid, maleic anhydride, ethylene imine, etc. If treated with epichlorohydrin or monochloroacetic acid, the resultant product can be further reacted with a tertiary amine, such as pyridine, or the like, to give quaternary ammonium compounds. If treated with maleic anhydride to give a total ester, the resultant can be treated with sodium bisulfite to yield a sulfosuccinate. Sulfo groups can be introduced also by means of a sulfating agent, as previously suggested, or by treating the chloroacetic acid resultant with sodium sulfite.

However, the class of derivatives most readily prepared in wide variety are the esters of monocarboxy and polycarboxy acids.

Assuming a typical derivative which can be indicated thus:

the ester of the monocarboxy acid is as follows:

The acid ester of a dicarboxy acid is as follows:

The complete ester of a dicarboxy acid is as follows:

The chloroacetic acid ester is as follows:

The quaternary compound obtained by reacting the above-mentioned product with pyridine is as follows:

Among the various kinds of monocarboxy acids suitable for preparation of esters, are the alpha-halogen monocarboxylic acids having not over 6 carbon atoms. Typical acids exemplifying this class are chloroacetic acid, dichloroacetic acid, bromoacetic acid, alpha-bromobutyric acid, etc. Needless to say, in this instance and all others where reference is made to the acid, the functional equivalent such as the acylchloride, the anhydride, the ester, the amide, etc., may be employed.

Another class of esters are those obtained from certain drastically-oxidized hydroxy acetylated castor oil fatty acids. The drastically-oxidized acetylated ricinoleic acid compounds are employed to furnish the acyl radical of the ester. In this particular instance, as in all other instances, one may prepare either a total ester or a partial ester, and when carboxy acids are employed, one may have not only partial esters which have residual hydroxyl radicals or residual carboxy radicals, but also partial esters in which both are present.

A somewhat similar type of ester is obtained from hydroxyacetylated drastically-oxidized castor oil fatty acids. It is to be pointed out that hydroxyacetylation may take place first, and drastic oxidation subsequently, or the reverse may be true, or both procedures may be conducted simultaneously. In any event, such products supply acyl radicals of one type of ester herein included.

Another somewhat similar class are esters obtained from hydroxyacetylated drastically-oxidized dehydrated ricinoleic acid. In this class ricinoleic acid, castor oil, or the like, is subjected to dehydration as an initial step. Such products may be employed to supply the acyl radical of one type of ester herein included.

Another type of ester which may be employed is a sulfo-fatty acid ester in which there is present at least 8 and not more than 22 carbon atoms in the fatty acid radical. The sulfo radical includes both the acid sulfonates and the sulfonic acids. Briefly stated, suitable sulfo acids herein employed as reactants are sulfo-oleic, sulfo-ricinoleic, sulfo-aromatic fatty acids obtained, for example, from benzene, toluene, xylene, etc., and oleic acid or some other unsaturated acid.

Another class of acids are polycarboxy acids, such as commonly used in forming plasticizers, polyester resins, etc. One may use a tricarboxy acid, such as tricarballylic acid, or citric acid, but our preference is to employ a dicarboxy acid, or acid anhydride, such as oxalic acid, maleic acid, tartaric acid, citraconic acid, phthalic acid, adipic acid, succinic acid, azeleic acid, sebacic acid, adduct acids obtained by reaction between maleic anhydride, citraconic anhydride, and butadiene, diglycollic acid, or cyclopentadiene. Oxalic acid is not quite as satisfactory as some of the other acids, due to its tendency to decompose. In light of raw material costs, it is our preference to use phthalic anhydride, maleic anhydride, citraconic anhydride, diglycollic acid, adipic acid and certain other acids in the same price range which are both cheap and heat-resistant. One may also use adduct acids of the dien or Clocker type.

Another class of esters are derived from certain high molal monocarboxy acids. It is well known that certain monocarboxy organic acids containing 8 carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and, of course, this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

The monocarboxy detergent-forming esters of the oxyalkylated derivatives herein described, are preferably derived from unsaturated fatty acids having 18 carbon atoms. Such unsaturated fatty acids include oleic acid, ricinoleic acid, linoleic acid, etc. One may employ mixed fatty acids, as, for example, the fatty acids obtained from hydrolysis of cottonseed oil, soyabean oil, etc. It is our ultimate preference that the esters of the kind herein contemplated be derived from unsaturated fatty acids, and more especially, unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefine, with steam, or by causing a halogenated hydrocarbon to react with potassium cyanide and saponifying the product obtained. Such products or mixtures thereof, having at least 8 and not more than 32 carbon atoms, and having at least one carboxyl group or the equivalent thereof, are suitable as detergent-forming monocarboxy acids; and another analogous class equally suitable is the mixture of carboxylic acids obtained by the alkali treatment of alcohols of high molecular weight formed in the catalytic hydrogenation of carbon monoxide.

One may have esters derived not only from a single class of acids of the kind described, but also from more than one class, i. e., one may employ mixed esters such as esters obtained, for example, from high molal detergent-forming acids having 8 to 22 carbon atoms, as previously described, in combination with acids of the alpha-halogen carboxy type having less than 8 carbon atoms, such as chloroacetic acid, bromoacetic acid, etc., as previously described.

Drastically-oxidized oil, such as drastically-oxidized castor oil, or drastically-oxidized dehydrated castor oil, may be employed to supply the acyl radical. In other instances, one may produce mixed esters by using polycarboxy acids, such as phthalic acid, diglycollic acid, etc., in combination with detergent-forming acids, such as oleic acid, stearic acid, naphthenic acid, etc.

Other carboxy acids may be employed in which there is also a sulfo group present, such as sulfo-phthalic, sulfo-benzoic, sulfo-succinic, etc. Esters may be obtained from low molal hydroxylated acids having less than 8 carbon atoms, such as hydroxyacetic acid, lactic acid, etc. Similarly, one may employ low molal aliphatic acids having less than 8 carbon atoms, such as acetic acid, butyric acid, etc. Similarly, one may employ low molal acids having the vinyl radical, such as acrylic acid, methacrylic acid, crotonic acid, etc. It will be noted that these acids contain various numbers of acyl radicals varying generally up to 22 carbon atoms for the monocarboxy acids, and as many as 36 carbon atoms in the case of certain polycarboxy acids, particularly the dimer obtained by the dimerization of 9,11-octadecadienic acid. As to this particular product, see U. S. Patent No. 2,347,562, dated April 25, 1944, to Johnston.

Other suitable acids are cyclic monocarboxy acids having not over 32 carbon atoms. Examples of such acids include cyclohexane acetic acid, cyclohexane butyric acid, cyclohexane propionic acid, cyclohexane carpoic acid, benzoic acid, salicylic acid, phenoxy acetic acid, etc.

The preparation of such esters are conventional and do not require elaborate description. Generally speaking, our procedure is to react the appropriate amount of a selected hydroxylated compound with the free acid in presence of a high boiling solvent, such as xylene, using 1% or 2% of para-toluene sulfonic acid along with a phase-separating trap until the amount of water indicates the reaction is complete, or substantially complete. The time required is usually 4 to 20 hours. Such esters are, as previously stated, very effective for resolution of water-in-oil emulsions, as found in the petroleum industry.

The triangular graph represents the three-component system. Using 4 reactants, i. e., the three depicted in the triangular graph, plus glycide, gives a four-reactant system which yields derivatives at least equal for demulsification of water-in-oil emulsions to those herein described. The use of glycide in a four-component reactant permits unusual structure, as, for example, a variety of furcation. Thus, the hydroxylated initial reactant can be treated with glycide in the conventional manner, using an alkaline catalyst, and after an introduction of a mole-for-mole ratio of glycide, then propylene oxide can be introduced in the manner previously described, and thereafter ethylene oxide can be added. If desired, the propylene oxide can be introduced first and then one mole of glycide added, followed by ethylene oxide, or both procedures can be employed.

Moreover, glycide can be used to replace a substantial part or greater part of the ethylene oxide, or propylene oxide, or both. Such compounds can be converted into various derivatives of the kind previously described. Under such circumstances, reaction with glycide and an end reactant to supply a terminal radical is not considered as forming a derivative, but as simply forming the end material. The ester and similar derivatives so obtained from the four-component original system, i. e., the ones including glycide, are also very effective for demulsification of water-in-oil emulsions, as found in the oil industry.

Having thus described our invention, what we claim as new and desire to secure by Letters Patent is:

1. A process for breaking petroleum emulsions of the water-in-oil type, characterized by subjecting the emulsion to the action of a demulsifier including at least one cogeneric mixture of a homologous series of glycol ethers of beta-terpineol; said cogeneric mixture being derived exclusively from beta-terpineol, ethylene oxide and propylene oxide in such weight proportions so the average composition of said cogeneric mixture stated in terms of initial reactants lies approximately within the trapezoidal area defined approximately in the accompanying drawing by points 8, 9, 10 and 11.

2. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, ethylene oxide and propylene oxide in such weight proportions so the average compositions of said cogeneric mixture stated in terms of initial reactants lies approximately within the trapezoidal area defined approximately in the accompanying drawing by points 8, 9, 10 and 11.

3. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, ethylene oxide and propylene oxide in such weight proportions so the average composition of said cogeneric mixture stated in terms of initial reactants lies approximately within the segment of the circle of the accompanying drawing in which the minimum beta-terpineol content is at least 4% and which circle is identified by the fact that points 1, 3 and 6 lie on its circumference.

4. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, ethylene oxide and propylene oxide in such weight proportions so the average composition of said cogeneric mixture stated in terms of initial reactants lies approximately within the triangular area defined in the accompanying drawing by points 1, 3 and 6.

5. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, ethylene oxide and propylene oxide in such weight proportions so the average composition of said cogeneric mixture stated in terms of initial reactants lies approximately within the triangular area defined in the accompanying drawing by points 2, 4 and 5.

6. A process for breaking petroleum emulsions of the water-in-oil type, characterized by subjecting the emulsion to the action of a demulsifier including a cogeneric mixture of a homologous series of glycol ethers of beta-terpineol; said cogeneric mixture being derived exclusively from beta-terpineol, ethylene oxide and propylene oxide in such weight proportions so the average composition of said cogeneric mixture stated in terms of initial reactants lies approximately at point 7 in the accompanying drawing.

7. A process for breaking petroleum emulsions of the water-in-oil type, characterized by subjecting the emulsion to the action of a demulsifier including a single cogeneric mixture of a homologous series of glycol ethers of beta-terpineol; said cogeneric mixture being derived exclusively from beta-terpineol, ethylene oxide and propylene oxide in such weight proportions so the average composition of said cogeneric mixture stated in terms of initial reactants lies approximately at point 7 in the accompanying drawings.

MELVIN DE GROOTE.
ARTHUR F. WIRTEL.
OWEN H. PETTINGILL.

REFERENCES CITED

The following references are of record in the file of this patent:

UNITED STATES PATENTS

| Number | Name | Date |
| --- | --- | --- |
| 2,233,383 | De Groote et al. | Feb. 25, 1941 |
| 2,243,330 | De Groote et al. | May 27, 1941 |
| 2,397,058 | Moeller | Jan. 5, 1943 |
| 2,317,726 | Boedeker | Apr. 27, 1943 |
| 2,330,474 | De Groote | Sept. 28, 1943 |
| 2,440,093 | Israel | Apr. 20, 1948 |
| 2,481,278 | Ballard et al. | Sept. 6, 1949 |